US012150402B1

(12) United States Patent
Jin et al.

(10) Patent No.: US 12,150,402 B1
(45) Date of Patent: Nov. 26, 2024

(54) TRANSPLANTING ROBOT APPLICABLE TO GREENHOUSE

(71) Applicant: Longmen Laboratory, Luoyang (CN)

(72) Inventors: Xin Jin, Luoyang (CN); Guoqing Zhao, Luoyang (CN); Mingyong Li, Luoyang (CN); Liqiang Xiao, Luoyang (CN); Yanbo Ma, Luoyang (CN); Xinwu Du, Luoyang (CN); Xiaolin Xie, Luoyang (CN); Xiqiang Ma, Luoyang (CN)

(73) Assignee: Longmen Laboratory, Luoyang (CN)

( * ) Notice: Subject to any disclaimer, the term of this patent is extended or adjusted under 35 U.S.C. 154(b) by 0 days.

(21) Appl. No.: 18/748,537

(22) Filed: Jun. 20, 2024

Related U.S. Application Data

(63) Continuation of application No. PCT/CN2024/082501, filed on Mar. 19, 2024.

(30) Foreign Application Priority Data

Nov. 16, 2023 (CN) .......................... 202311524291.X

(51) Int. Cl.
*A01C 11/00* (2006.01)
*A01G 9/14* (2006.01)
*B25J 5/00* (2006.01)
*B62D 57/032* (2006.01)

(52) U.S. Cl.
CPC ................. *A01C 11/00* (2013.01); *B25J 5/00* (2013.01); *B62D 57/032* (2013.01); *A01G 9/14* (2013.01)

(58) Field of Classification Search
CPC ...... B62D 57/032; B62D 57/02; B62D 57/00; A01C 11/00; B25J 5/00; A01G 9/14; A01G 9/00
See application file for complete search history.

(56) References Cited

FOREIGN PATENT DOCUMENTS

| AU | 2020100699 A4 | 6/2020 |
|---|---|---|
| CN | 1338357 A | 3/2002 |
| CN | 101715670 A | 6/2010 |

(Continued)

OTHER PUBLICATIONS

China National Intellectual Property Administration, First Office Action in Patent Application No. CN202311524291.X issued on Dec. 26, 2023, which is a foreign counterpart application corresponding to this U.S. Patent Application, to which this application claims priority.

(Continued)

*Primary Examiner* — Christopher J. Novosad
(74) *Attorney, Agent, or Firm* — Kolitch Romano Dascenzo Gates LLC

(57) ABSTRACT

A transplanting robot applicable to a greenhouse includes a walking device and planting devices; the walking device includes a chassis, a driving assembly mounted on the chassis, and several walking leg modules arranged on two sides of the chassis; each walking leg module is provided with the planting device that moves synchronously with the walking leg module; the driving assembly is provided with a walking motor; and the walking motor outputs power to two transmission shafts through a transmission assembly and two independent electromagnetic clutches. When any electromagnetic clutch is turned on, the corresponding transmission shaft outputs, through transmission gears on the transmission shaft, power to the walking leg module connected to the electromagnetic clutch.

8 Claims, 7 Drawing Sheets

(56) References Cited

FOREIGN PATENT DOCUMENTS

| | | |
|---|---|---|
| CN | 101746429 A | 6/2010 |
| CN | 203467185 U | 3/2014 |
| CN | 104904394 A | 9/2015 |
| CN | 105620583 A | 6/2016 |
| CN | 206024710 U | 3/2017 |
| CN | 206125222 U | 4/2017 |
| CN | 206781912 U | 12/2017 |
| CN | 108583715 A | 9/2018 |
| CN | 108811555 A | 11/2018 |
| CN | 110723232 A | 1/2020 |
| CN | 115088438 A | 9/2022 |
| CN | 217608314 U | 10/2022 |
| CN | 115997532 A | 4/2023 |
| CN | 116649060 A | 8/2023 |
| CN | 116729519 A | 9/2023 |
| CN | 117242958 A | 12/2023 |
| JP | 2003219712 A | 8/2003 |
| KR | 20100061133 A | 6/2010 |
| KR | 20140021752 A | 2/2014 |
| WO | 2017181976 A1 | 10/2017 |

OTHER PUBLICATIONS

Notification to Grant Invention Patent Right for Chinese Patent Application No. CN202311524291.X issued on Jan. 12, 2024.
International Search Report of the International Searching Authority for State Intellectual Property Office of the People's Republic of China in PCT application No. PCT/CN2024/082501 issued on May 23, 2024, which is an international application to which this application claims priority.

TRANSPLANTING ROBOT APPLICABLE TO GREENHOUSE

CROSS-REFERENCE TO RELATED APPLICATION

This application is a continuation application of International Application No. PCT/CN2024/082501, filed on Mar. 19, 2024, which claims the priority of Chinese Application No. 202311524291.X, filed on Nov. 16, 2023, both of which are incorporated by reference herein.

TECHNICAL FIELD

The present application relates to the technical field of transplanting machinery, and in particular, to a transplanting robot applicable to a greenhouse.

BACKGROUND

Seedling transplantation can effectively reduce the costs and facilitate centralized management of seedlings. It is beneficial for cultivating high-quality seedlings. This planting method has advantages of high-quality operation effect, reduction of time and cost, high survival rate and stability of seedlings, and the like.

In recent years, the area and yield of vegetables in China have continuously increased, and the greenhouse planting range is largest. However, due to a limited working space in the greenhouse, traditional agricultural machinery cannot work due to a large volume. Some existing small-sized transplanting machines have poor coordination between a walking unit and a planting unit, and most of the transplanting machines can only plant one or two rows of seedlings at the same time, causing low efficiency. Therefore, there is an urgent need to develop a small-sized transplanting machine that is suitable for greenhouse ridges and has high efficiency.

SUMMARY

The present application aims to provide a transplanting robot applicable to a greenhouse.

A technical solution used in the present application is as follows: A transplanting robot applicable to a greenhouse includes a walking device and several planting devices mounted on the walking device, wherein the walking device includes a chassis, a driving assembly mounted on the chassis, and several walking leg modules arranged on two sides of the chassis; and each walking leg module is provided with a planting device that moves synchronously with the walking leg module.

The driving assembly is provided with a walking motor; the walking motor outputs power to two transmission shafts through a transmission assembly and two independent electromagnetic clutches; when any electromagnetic clutch is turned on, the corresponding transmission shaft outputs, through transmission gears on the transmission shaft, power to the walking leg module connected to the electromagnetic clutch; each walking leg module includes a power transmission assembly connected to the transmission gear and a walking leg connected to the power transmission assembly through a leg shaft; a middle part of the leg shaft is rotationally mounted, through a bearing assembly, in a circular arc slot of a semicircular arc slot plate fixedly connected to the chassis; and the power transmission assembly drives the walking leg to move along a semicircular trajectory through the leg shaft.

In some embodiments, for the driving assembly, an output end of the walking motor outputs the power to the two electromagnetic clutches through gears and racks; an output end of each electromagnetic clutch is connected with one transmission shaft; each transmission shaft outputs power to the corresponding group of walking leg modules through the gears and the racks; and a single power source drives the two groups of walking legs separately through the electromagnetic clutches and a gear set.

In some embodiments, there are three walking leg modules on each side; the front and back walking leg modules on one side and the middle walking leg module on the other side form a group of walking leg unit for stepping; the walking motor outputs power; when one group of walking leg unit performs a stepping action, the electromagnetic clutch on the corresponding transmission shaft is turned on, and the electromagnetic clutch on the transmission shaft corresponding to the other group of walking leg unit for supporting is turned off; and when the two groups of walking leg unit complete the stepping actions, the electromagnetic clutches on the two transmission shafts are turned on, and the walking motor rotates anticlockwise to enable the chassis to move forward by one unit length to restore an initial state before walking.

In some embodiments, each walking leg module includes a walking leg gear that is in meshing connection to the transmission gear, a screw rod coaxially connected to the walking leg gear, a moving plate mounted on the screw rod, a sliding block, and a walking leg; the sliding block is mounted in a sliding slot of the moving plate and moves vertically in a reciprocating manner; a limiting plate for limiting the sliding block is arranged at a top of the moving plate; a top end of the sliding block is connected to the limiting plate through a first spring; a middle part of a leg shaft connected to the walking leg is rotationally mounted, through a bearing assembly, in a circular arc slot of a semicircular arc slot plate fixedly connected to the chassis; and one end of the leg shaft is fixedly connected to the sliding block after passing through the circular arc slot.

In some embodiments, each walking leg module is further provided with a guide rod for positioning and guiding the moving plate, and a limiting block for limiting the moving plate is arranged at one end of the guide rod.

In some embodiments, a sliding block and a guide rail are mounted at a bottom of each rack.

In some embodiments, the transplanting robot includes six groups of planting devices which are respectively fixedly mounted on the corresponding walking leg modules and synchronously move with the walking leg modules; each group of the planting device is composed of a driving motor, a screw module, and a duckbill planting apparatus; and the driving motor outputs power and drives the duckbill planting apparatus to move through the screw module.

In some embodiments, the duckbill planting apparatus includes a duckbill mounting bracket fixedly connected to the screw module, a funnel, and a left duckbill and a right duckbill which are mounted on the duckbill mounting bracket through pin shafts; a second spring is connected between the left duckbill and the right duckbill; and when the screw module drives the duckbill planting apparatus to move downwards, car plates on two sides of the left right duckbill and the right duckbill are opened by blockage of the walking leg.

In some embodiments, for the walking device, a folding wheel group is further arranged at a bottom of the chassis; and in an operating state of the transplanting robot, the folding wheel group is folded below the chassis through a connecting rod assembly on the folding wheel group.

In some embodiments, the folding wheel group includes a folding wheel mounting bracket fixedly connected below the chassis, a wheel rod, transverse movement wheels, an electric push rod, and the connecting rod assembly; an upper end of the wheel rod is hinged to the folding wheel mounting bracket, and a lower end is connected to the transverse movement wheel; and the electric push rod and connecting rod assembly are mounted between the folding wheel mounting bracket and the wheel rod.

In a transplanting robot applicable to a greenhouse according to the present application: a single power source is used in the walking device, and the power is output to the two transmission shafts through the transmission assembly and the two independent electromagnetic clutches. When any electromagnetic clutch is turned on, the corresponding transmission shaft outputs, through a plurality of transmission gears on the transmission shaft, power to the walking leg module connected to the electromagnetic clutch, thereby driving the plurality of walking leg modules to move along the semicircular trajectory. The above structure achieves that the single power source separately drives the two groups of walking leg unit through the electromagnetic clutches and a gear set. Meanwhile, each walking leg module is provided with the planting device that moves synchronously with the walking leg module. An independent power source is provided in the planting device to drive the planting apparatuses to be opened and closed to achieve planting. The opening and closing actions of the plurality of planting apparatus overall cooperate with the plurality of walking leg modules to achieve continuous planting.

Further, since a multi-legged robot moves forward in a tripod gait, transplantation of multiple seedlings in two rows can be simultaneously completed. The operation efficiency can be greatly improved compared with the operation efficiency of a transplantation machine with a single planting apparatus. Furthermore, the transplanting robot of the present application achieves switching between a walking state and a wheeled movement state through folding wheels, which can cross ridges without turning, thereby address the issue that it is difficult to turn in a narrow space in a greenhouse.

BRIEF DESCRIPTION OF THE DRAWINGS

To describe the technical solutions in the embodiments of the present application or in the related art more clearly, the following briefly introduces the accompanying drawings for describing the embodiments or the related art. Apparently, the accompanying drawings in the following description show merely some embodiments of the present application, and a person of ordinary skill in the art may still derive other drawings from the accompanying drawings without creative efforts.

Figure 1:
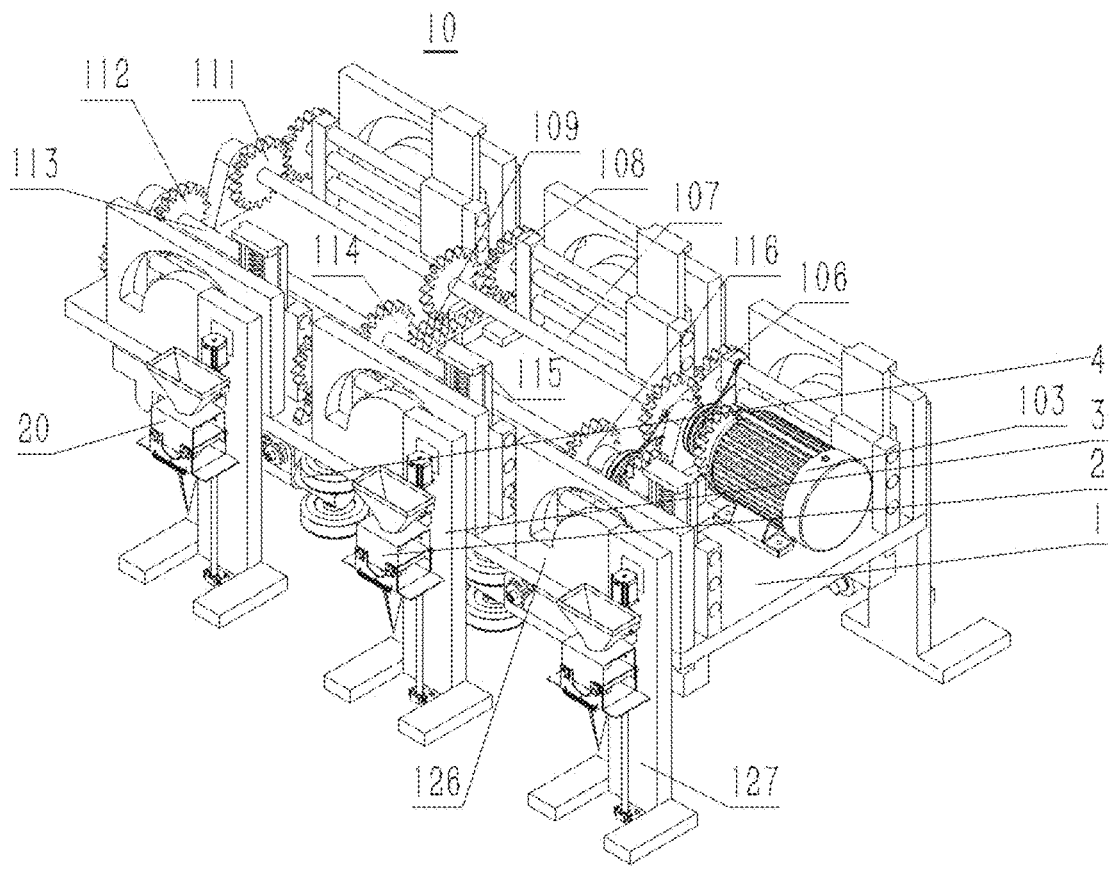
FIG. 1 is a schematic diagram of a transplanting robot according to some embodiments of the present application.

Reference numerals in the accompanying drawings: 1: walking device; 101: chassis; 102: first gear; 103: walking motor; 104: electromagnetic clutch; 105: bearing pedestal; 106: second gear; 107: first transmission shaft; 108: third gear; 109: first rack; 110: guide rail mounting plate; 111: fourth gear; 112: fifth gear; 113: second transmission shaft; 114: sixth gear; 115: second rack; 116: seventh gear; 117: third rack; 118: eighth gear; 119: walking leg gear; 120: limiting block; 121: guide rod; 122: screw rod; 123: moving plate; 124: sliding block; 125: first spring; 126: semicircular arc slot plate; 127: walking leg; 128: leg shaft;

- 2: duckbill planting apparatus; 201: funnel; 202: duckbill mounting bracket; 203: pin shaft; 204: left duckbill; 205: gasket; 206: cotter pin; 207: right duckbill; 208: second spring;
- 3: screw module;
- 4: folding wheel group; 401: transverse movement wheel; 402: wheel rod; 403: first connecting rod; 404: second connecting rod; 405: electric push rod; and 406: folding wheel mounting bracket.

DETAILED DESCRIPTION

The present application will be specifically described below through exemplary implementations. However, it should be understood that without further description, elements, structures, and features in one implementation can also be beneficially integrated into other implementations.

It should be noted that unless otherwise defined, the technical or scientific terms used herein should have the usual meanings understood by those of ordinary skill in the art to which the present application belongs. Similar terms such as "one", "a/an", or "the" in the specification and claims of the patent application of the present application does not express a quantity limitation, but indicates the existence of at least one. The term such as "include" or "including" means that an element or object that appears in font of "include" or "including" encompasses those behind "include" or "including" and their equivalents, but do not exclude other elements or objects with the same function.

Some examples of structural composition and working process of a transplanting robot applicable to a greenhouse are described in conjunction with FIG. 1 to FIG. 7.

In some embodiments, a hexapod transplanting robot 10 is taken as an example. As shown in FIG. 1, a transplanting robot 10 applicable to a greenhouse is mainly composed of a walking device 1 and several planting devices mounted on the walking device. The walking device 1 includes a chassis, a driving assembly mounted on the chassis, and a plurality of walking leg modules arranged on two sides of the chassis. Each planting device is composed of a duckbill planting apparatus 2 and a screw module 3. The duckbill planting apparatus 2 is fixedly connected to a moving block of the screw module 3 through a bolt; and the screw modules 3 are fixedly mounted on the walking leg modules and move synchronously with the walking leg modules. The screw modules 3 are driven by independent driving motors.

Figure 2:
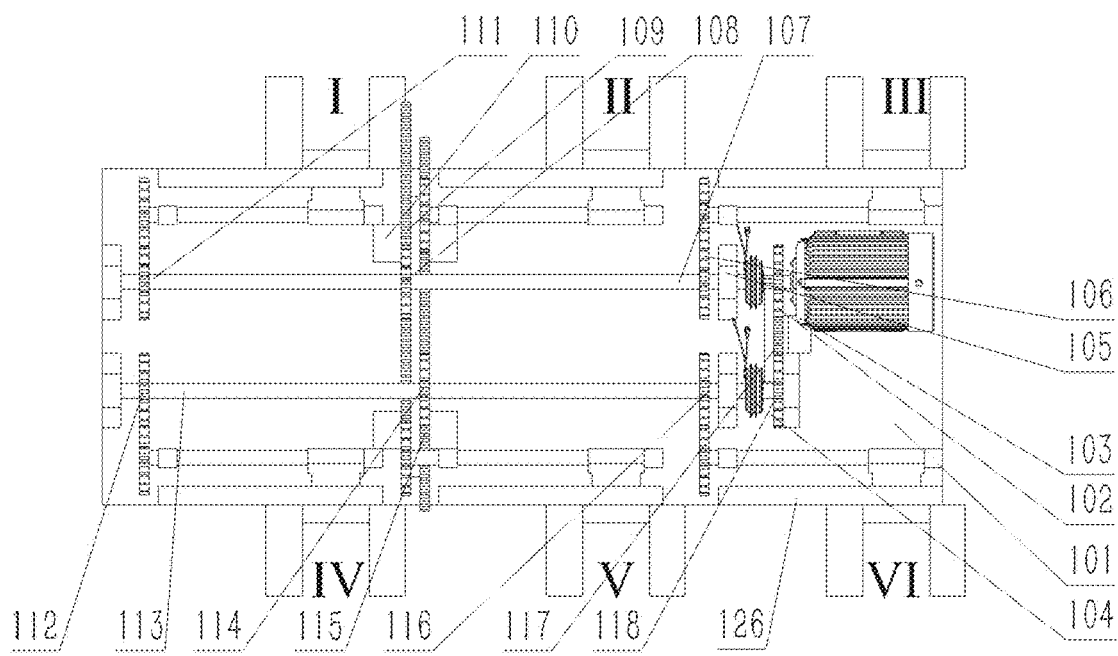
FIG. 2 is a schematic structural diagram of a walking device of a transplanting robot according to some embodiments of the present application.

As shown in FIG. 1 and FIG. 2, in some embodiments, three walking leg modules I, II and III are uniformly distributed on one side of the chassis 101 of the walking device 1, and three walking leg modules IV, V, and VI are uniformly distributed on another side of the chassis 101 of the walking device 1. The transplanting robot 10 is powered by an independent walking motor 103. The walking motor 103 outputs power to a first transmission shaft 107 and a second transmission shaft 113 through a first gear 102, an eighth gear 118, a third rack 117, and two independent electromagnetic clutches 104. As shown in FIG. 1 and FIG. 2, it can be seen that each transmission shaft is connected with three transmission gears, and each transmission gear is connected with the corresponding walking leg module. When any electromagnetic clutch is turned on, the corresponding transmission shaft outputs, through the transmission gears on the transmission shaft, power to the walking leg modules connected to the transmission shaft. A detailed description according to the accompanying drawings is as follows:

As shown in FIG. 1 and FIG. 2, a second gear 106, a third gear 108, and a fourth gear 111 are mounted on the first transmission shaft 107. The fourth gear 111 and the second gear 106 correspond to a walking leg module I and a walking leg module III on one side of the driving chassis respectively. A bearing pedestal 105 is provided at the ends of shaft 107 for fixing the shaft 107. The third gear 108 drives a walking leg module V on the other side of the chassis through a first rack 109. The walking leg module I, the walking leg module III, and the walking leg module V form a group of walking leg unit for stepping as a whole. That is, a front walking leg module and a back walking leg module on one side and a middle walking leg module on the other side form a group of walking leg unit.

A fifth gear 112, a sixth gear 114, and a seventh gear 116 are mounted on the second transmission shaft 113. The fifth gear 112 and the seventh gear 116 correspond to a walking leg module IV and a walking leg module VI on one side of the driving chassis respectively. A bearing pedestal 105 is provided at the ends of shaft 107 for fixing the shaft 113. The sixth gear 114 drives a walking leg module II on the other side of the chassis through a second rack 115. The walking leg module IV, the walking leg module VI, and the walking leg module II form the other group of walking leg unit for stepping as a whole. That is, a front walking leg module and a back walking leg module on one side and a middle walking leg module on the other side form a group of walking leg unit.

Figure 3:
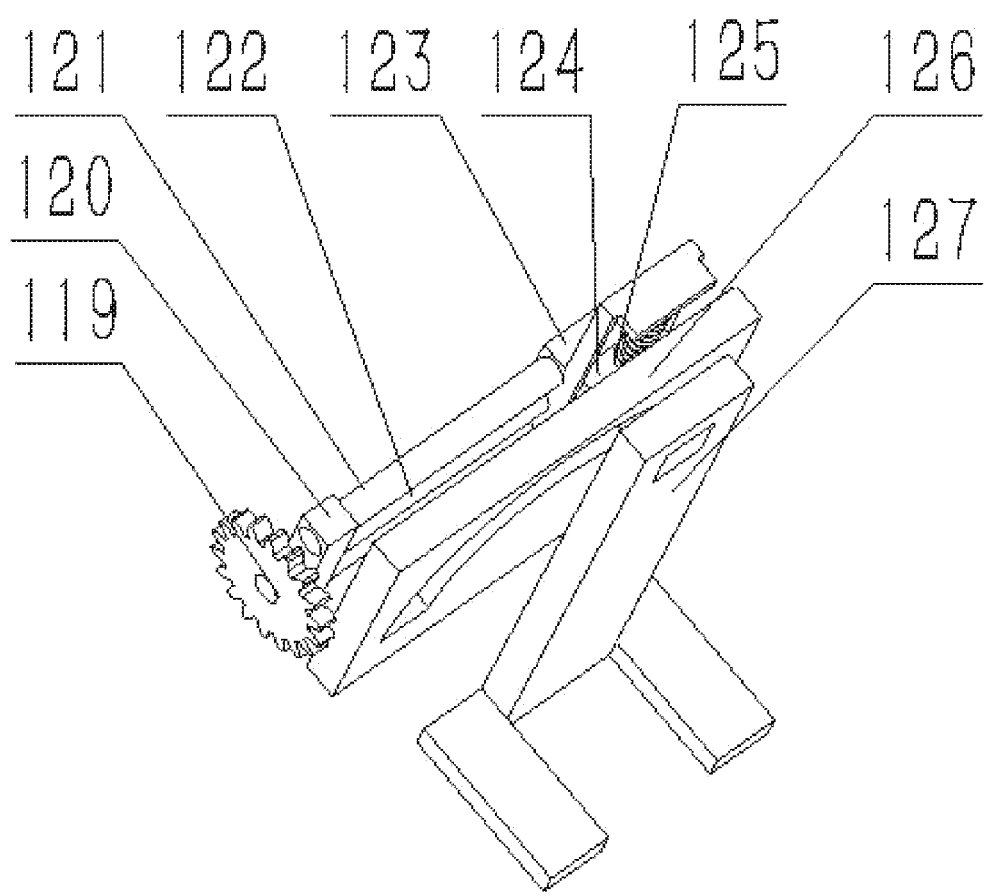
FIG. 3 is a schematic diagram of a three-dimensional structure of a walking leg module of a transplanting robot according to some embodiments according to the present application.
Figure 4:
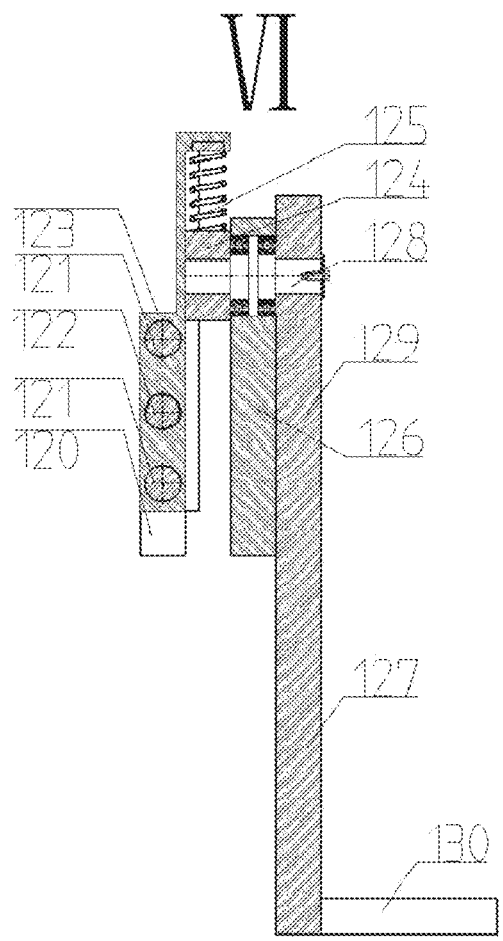
FIG. 4 is a schematic diagram of a sectional structure of a walking leg module of a transplanting robot according to some embodiments of the present application.

A walking leg module VI is taken as an example to illustrate the structure. As shown in FIG. 3 and FIG. 4, each walking leg module includes a walking leg gear 119, a limiting block 120, guide rods 121, a screw rod 122 coaxially connected to the walking leg gear 119, a moving plate 123 mounted on the screw rod 122, a sliding block 124, and a walking leg 127. The walking leg gear 119 is connected to one end of the screw rod 122 through a key; the two guide rods 121 are connected to the limiting block 120 through threads at two ends; a middle hole of the moving plate 123 forms a threaded pair with the screw rod 122, and upper and lower holes form a moving pair with the guide rods 121; the sliding block 124 is mounted in a sliding slot of the moving plate 123 and can move vertically in a reciprocating manner; a limiting plate for limiting the sliding block is arranged at a top of the moving plate 123; a top end of the sliding block 124 is connected to the limiting plate through a first spring 125, and the sliding block 124 is in threaded connection with a leg shaft 128; two rolling bearings are mounted on the leg shaft 128; the two bearings are located in a circular arc slot of a semicircular arc slot plate 126; a portion of the leg shaft 128 connected to the walking leg 127 is a square shaft; and a shaft end is limited by a shaft end retaining ring. The walking leg 127 comprises a leg 129 and two feet 130.

From the above description, it can be seen that the gears on the two transmission shafts respectively drive the walking leg gears 119 on the six walking leg modules on the two sides to rotate, causing the screw rod 122 coaxial with the walking leg gears 119 to rotate. The rotation of the screw rods 122 causes the moving plates 123 mounted on the screw rods 122 to move along the screw rods 122. Under the action of the semicircular arc slot plates 126, the sliding blocks 124 connected to the moving plates 123 through the first springs 125 do a semicircular arc motion along the semicircular arc slot plates 126 through circular rollers on the sliding blocks 124, thereby driving the walking legs fixedly connected to the sliding blocks 124 to move forward in a semicircular trajectory. The robot walks in a tripod gait, namely, the front and back walking leg modules on one side and the middle walking leg module on the other side form a group for stopping. As shown in FIG. 2, I, III, and V form one group, and II, IV, and VI form one group. When one group of walking legs performs a stepping action, the electromagnetic clutch 104 on the transmission shaft of the corresponding group of walking legs is turned on, and the electromagnetic clutch 104 on the transmission shaft corresponding to the other group of walking legs for supporting is turned off. After the two groups of walking groups have completed the stepping actions, the electromagnetic clutches 104 on the two transmission shafts are turned on; and the rotation of the motor anticlockwise enables the chassis 101 to move forward by one unit length, an initial state before walking is restored at this time. The above process is repeatedly completed to achieve walking of the robot.

In some embodiments, sliding blocks and guide rails are mounted at bottoms of the first rack 109, the second rack 115, and the third rack 117.

Figure 5A:
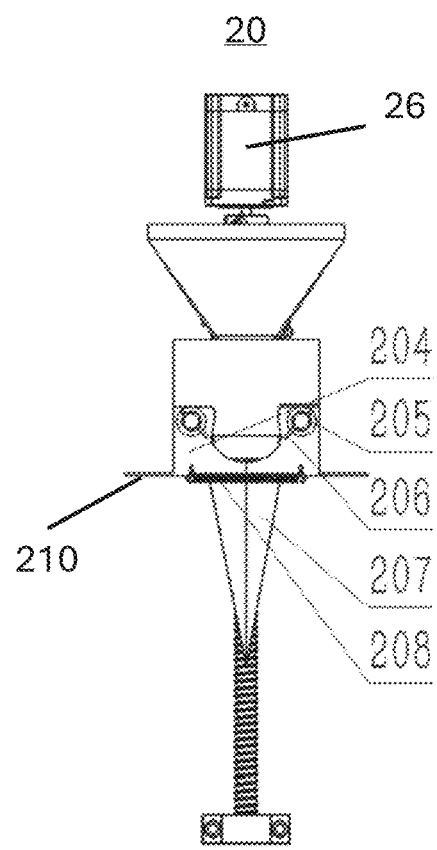
FIG. 5A and FIG. 5B are schematic structural diagrams of a planting device of a transplanting robot according to some embodiments of the present application.
Figure 5B:
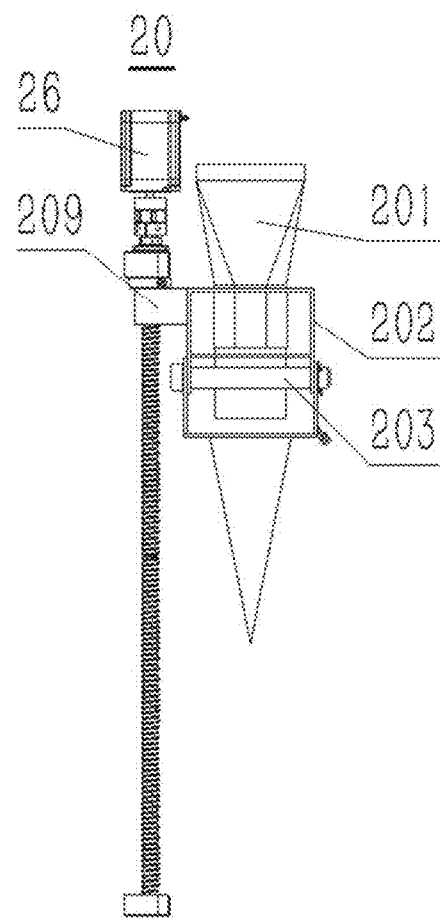

In some embodiments, as shown in FIG. 1 and FIG. 2, the transplanting robot 10 includes six groups of planting devices 20 which are respectively fixedly mounted on the corresponding walking leg modules and move synchronously with the walking leg modules. FIG. 5A and FIG. 5B illustrate an example of a planting device of a transplanting robot according to some embodiments of the present application. Each planting device 20 is composed of a driving motor 26, a screw module 3, and a duckbill planting apparatus 2. The duckbill planting apparatus 2 is fixedly connected to a moving block 209 of the screw module 3 through a bolt, and the driving motor 26 outputs power, which drives the duckbill planting apparatus 2 to operate through the screw module 3. The duckbill planting apparatus 2 includes a duckbill mounting bracket 202 fixedly connected to the moving block 209 of the screw module 3, a funnel 201, a gasket 205, a cotter pin 206, and a left duckbill 204 and a right duckbill 207 which are arranged on the duckbill mounting bracket 202. The left duckbill 204 and the right duckbill 207 are respectively mounted on the duckbill mounting bracket 202 through the gasket 205, a pin 205 and the cotter pin 206, and a second spring 208 is further connected between the left duckbill 204 and the right duckbill 207. Taking the right duckbill 207 as an example, the pin 203 penetrates the duckbill mounting bracket 202 and the right duckbill 207, forming a rotating pair between the duckbill mounting bracket 202 and the right duckbill 207, so that the right duckbill 207 can rotate relative to the duckbill mounting bracket 202 with the pin 203 as the center.

The tip of the duckbill is positioned to be aligned with a space between the two feet 130 of the walking leg 127. Each of the left duckbill 204 and the right duckbill 207 includes a flat plate 210 extending out horizontally. Each of the flat plates 210 is positioned above the corresponding feet 130 of the walking leg 127. When the transplanting robot is going to perform a transplanting operation, the screw modules 3 drive the duckbill planting apparatuses 2 to move downwards. At this time, seedlings are fed into the funnels 201 of the duckbill planting apparatuses 2. When flat plates 210 on two sides of the duckbill planting apparatuses 2 are in contact with the feet 130 of the walking legs 127 and the duckbill planting apparatuses 2 are driven by the screw modules 3 to continuously move downwards, the duckbills 204 and 207 of the duckbill planting apparatuses 2 are opened by the blockage of the walking legs 127, so that the seedlings fall into the soil to complete transplantation. When the duckbill planting apparatuses 2 move upwards, the duckbills 204 and 207 on the two sides are closed under the action of the second springs 208.

Figure 6A:
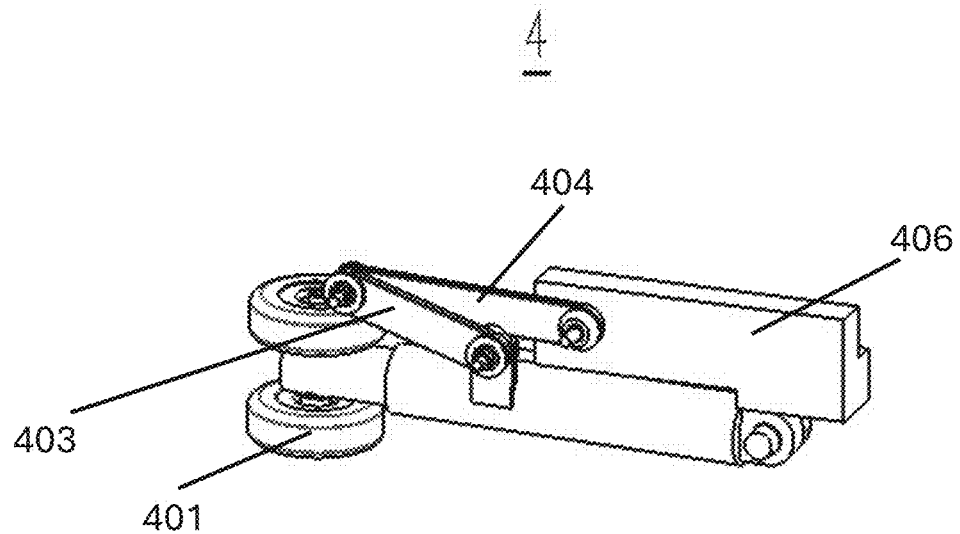
FIGS. 6A and 6B are schematic diagram of a folding wheel group of a transplanting robot according to some embodiments, illustrating in a folded state and an unfolded state.
Figure 6B:
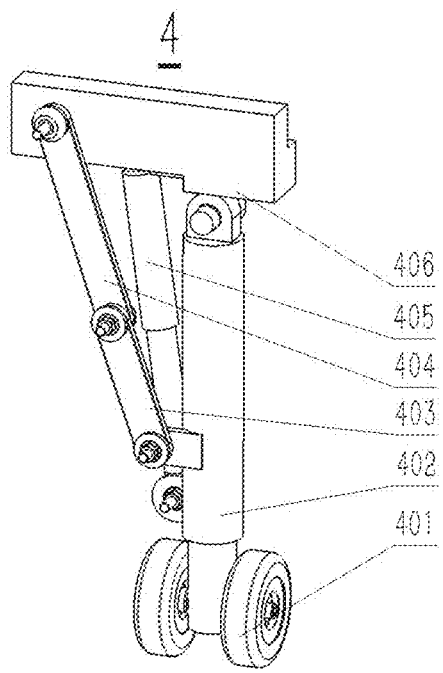

As shown in FIG. 1, FIG. 6A and FIG. 6B, for the walking device, a folding wheel group 4 is further arranged at a bottom of the chassis 101; and in an operating state of the transplanting robot, the folding wheel group 4 is folded below the chassis 101 through a connecting rod assembly on the folding wheel group 4. The folding wheel group 4 of the present application is folded under the chassis 101 of the transplanting robot during the operation of the transplanting robot. When the transplanting robot completes the transplantation of one row of seedlings, an electric push rod 405 on the folding wheel extends out, causing the folding wheel group 4 to change from a horizontal state to a vertical state. Directions of transverse movement wheels 401 of the folding wheel group 4 are perpendicular to a walking direction of the transplanting robot. The transplanting robot can move transversely from one completed row to a next row to be transplanted without turning through wheel hub motors. In this embodiment, the folding wheel group 4 uses the following structure: a folding wheel mounting bracket 406 fixedly connected below the chassis 101, a wheel rod 402, the transverse movement wheels 401, the electric push rod 405, and a connecting rod assembly composed of a first connecting rod 403 and a second connecting rod 404. An upper end of the wheel rod 402 is hinged to the folding wheel mounting bracket 406, and a lower end is connected to the transverse movement wheels 401; and the electric push rod 405 and the connecting rod assembly are mounted between the folding wheel mounting bracket 406 and the wheel rod 402.

Figure 7:
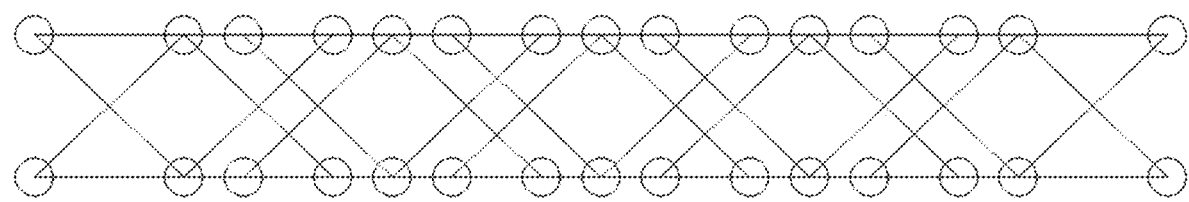
FIG. 7 is a diagram of planting locations of a transplanting robot according to some embodiments of the present application.

In this embodiment, FIG. 7 is a diagram of planting locations of the transplanting robot. Circles represents positions of the planted seedlings, and a closed triangle composed of three circles and lines represents a transplanting action. The transplanting robot walks in a tripod gait. The figure shows a triangle formed by the left legs and a triangle formed by the right legs. As shown in the figures, during each transplantation, the left and right legs respectively perform transplantation once. After the transplantation is completed, the transplanting apparatuses rise upwards. After completing the transplantation once, the transplanting robot continues to move forward for three times. At the third step, the transplanting apparatuses move downwards to complete second transplantation, and so on, to achieve continuous planting operations.

It should be pointed out that although the present application has been described through the above implementations, the present application may further have many other implementations. Without departing from the spirit and scope of the present application, it is apparent that those skilled in the art can make various corresponding changes and transformations to the present application, but these changes and transformations should all fall within the scope protected by the appended claims and their equivalents of the present application.

What is claimed is:

1. A transplanting robot applicable to a greenhouse, comprising a walking device and a plurality of planting devices mounted on the walking device, wherein
   the walking device comprises a chassis, a driving assembly mounted on the chassis, and a plurality of walking leg modules arranged on two sides of the chassis; wherein each walking leg module is provided with a planting device that moves synchronously with the walking leg module; the driving assembly is provided with a walking motor; the walking motor outputs power to two transmission shafts through a transmission assembly and two independent electromagnetic clutches; wherein when any electromagnetic clutch is turned on, the corresponding transmission shaft outputs, through transmission gears on the transmission shaft, power to the walking leg module connected to the electromagnetic clutch;
   there are three walking leg modules on each side; a front walking leg module and a back walking leg module on one side and a middle walking leg module on the other side form a group of walking leg unit for stepping; wherein the walking motor outputs power; when one group of walking leg unit performs a stepping action, the electromagnetic clutch on the corresponding transmission shaft is turned on, and the electromagnetic clutch on the transmission shaft corresponding to the other group of walking leg unit for supporting is turned off; when the two groups of walking leg unit complete the stepping actions, the electromagnetic clutched on the two transmission shafts are turned on, and the walking motor rotates anticlockwise to enable the chassis to move forward by one unit length to restore an initial state before walking;
   each walking leg module comprises a walking leg gear that is in meshing connection to the transmission gear, a screw rod coaxially connected to the walking leg gear, a moving plate mounted on the screw rod, a sliding block, and a walking leg; wherein the sliding block is mounted in a sliding slot of the moving plate and moves vertically in a reciprocating manner; a limiting plate for limiting the sliding block is arranged at a top of the moving plate; a top end of the sliding block is connected to the limiting plate through a first spring; a middle part of a leg shaft connected to the walking leg is rotationally mounted, through a bearing assembly, in a circular arc slot of a semicircular arc slot plate fixedly connected to the chassis; one end of the leg shaft is fixedly connected to the sliding block after passing through the circular arc slot; and wherein the power output by the walking motor drives the walking legs to move along a semicircular trajectory through the leg shafts.

2. The transplanting robot applicable to the greenhouse according to claim 1, wherein for the driving assembly, an output end of the walking motor outputs the power to the two electromagnetic clutches through gears and racks; an output end of each electromagnetic clutch is connected with one transmission shaft; each transmission shaft outputs power to the corresponding group of walking leg modules through the gears and the racks; and a single power source drives the two groups of walking legs separately through the electromagnetic clutches and a gear set.

3. The transplanting robot applicable to the greenhouse according to claim 2, wherein a sliding block and a guide rail are mounted at a bottom of each rack.

4. The transplanting robot applicable to the greenhouse according to claim 1, wherein each walking leg module is further provided with a guide rod for positioning and guiding the moving plate, and a limiting block for limiting the moving plate is arranged at one end of the guide rod.

5. The transplanting robot applicable to the greenhouse according to claim 1, wherein the transplanting robot comprises six groups of planting devices which are respectively fixedly mounted on the corresponding walking leg modules and synchronously move with the walking leg modules; each group of the planting device is composed of a driving motor, a screw module, and a duckbill planting apparatus; and the driving motor outputs power and drives the duckbill planting apparatus to move through the screw module.

6. The transplanting robot applicable to the greenhouse according to claim 5, wherein the duckbill planting apparatus comprises a duckbill mounting bracket fixedly connected to the screw module, a funnel, and a left duckbill and a right duckbill which are mounted on the duckbill mounting bracket through pin shafts; a second spring is connected between the left duckbill and the right duckbill; and when the screw module drives the duckbill planting apparatus to move downwards, ear plates on two sides of the left right duckbill and the right duckbill are opened by blockage of the walking leg.

7. The transplanting robot applicable to the greenhouse according to claim 1, wherein for the walking device, a folding wheel group is further arranged at a bottom of the chassis; wherein in an operating state of the transplanting robot, the folding wheel group is folded below the chassis through a connecting rod assembly on the folding wheel group.

8. The transplanting robot applicable to the greenhouse according to claim 7, wherein the folding wheel group comprises a folding wheel mounting bracket fixedly connected below the chassis, a wheel rod, transverse movement wheels, an electric push rod, and the connecting rod assembly; an upper end of the wheel rod is hinged to the folding wheel mounting bracket, and a lower end is connected to the transverse movement wheel; and the electric push rod and connecting rod assembly are mounted between the folding wheel mounting bracket and the wheel rod.

* * * * *